United States Patent [19]
Porter et al.

[11] Patent Number: 4,821,990
[45] Date of Patent: Apr. 18, 1989

[54] FLASHLIGHT HOLDER

[76] Inventors: Toney L. Porter; Floyce M. Porter, both of P.O. Box 1896, Eldorado, Ark. 71730

[21] Appl. No.: 132,163
[22] Filed: Dec. 11, 1987
[51] Int. Cl.⁴ .......................................... F16M 11/00
[52] U.S. Cl. ............................ 248/316.5; 248/231.5
[58] Field of Search ............. 248/316.5, 231.5, 231.8, 248/316.7, 316.1, 127; 362/396

[56] References Cited
U.S. PATENT DOCUMENTS

| | | | |
|---|---|---|---|
| 1,557,746 | 10/1925 | Voorhees | 248/316.7 |
| 1,701,419 | 2/1929 | Peden | 248/316.5 X |
| 1,807,501 | 5/1931 | Alexander | 248/229 |
| 1,963,463 | 6/1934 | Hammer | 248/316.5 X |
| 2,069,681 | 2/1937 | Predit | 248/231.5 X |
| 4,586,687 | 5/1986 | Ziaylek, Jr. | 248/316.5 X |

*Primary Examiner*—Alvin C. Chin-Shue
*Attorney, Agent, or Firm*—Cushman, Darby & Cushman

[57] ABSTRACT

A flashlighter hold which can securely hold a flashlight and which also allows for the easy removal and replacement of the flashlight from the holder is disclosed. This is possible because of the orientation of clasps and connecting members which allow clasps along one side of the flashlight holder to open and close more easily than clasps on the other side of the flashlight holder.

3 Claims, 2 Drawing Sheets

FLASHLIGHT HOLDER

BACKGROUND OF THE INVENTION

1. Field of the Invention

This invention relates to an apparatus which holds a flashlight and allows for the easy positioning of the flashlight in the holder and the easy removal of the flashlight from the holder.

2. Background of the Prior Art

Apparatuses for holding flashlights are well known in the art. For example, U.S. Pat. No. 1,807,501 to Alexander discloses a flashlight holder which uses a plurality of clasps to hold a flashlight in a set position. These clasps are held in place by a combination of shafts and springs. These shafts and springs are positioned so that the clasps stay in an open position once the flashlight is removed and the clasps stay in a closed position when the flashlight is placed within the clasps so that the flashlight is securely held.

However, for this flashlight holder to operate, the force required to overcome the spring tension when the holder is open or closed is shared equally by all the clasps of the flashlight holder. Therefore, opening and closing the flashlight holder can be very difficult and, therefore, the device is not that easy to use. In addition, the device is complicated and therefore relatively costly to construct.

SUMMARY OF THE INVENTION

To overcome the disadvantages of the prior art, the present inventors have developed a flashlight holder which can securely hold the flashlight and which also allows for the easy removal and replacement of the flashlight from the holder.

This easy removal and replacement of the flashlight from the flashlight holder is accomplished by allowing clasps on one side of the flashlight holder to move more easily than the clasps on the other side of the flashlight holder. Therefore, when the flashlight holder is opened or closed, the clasps which can open and close more easily bring about most of the opening or closing motion. Therefore, as will be explained in further detail hereinafter, because of this configuration, the flashlight can be removed or replaced from the flashlight holder more easily than in the prior art and can be manufactured more simply.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 1:
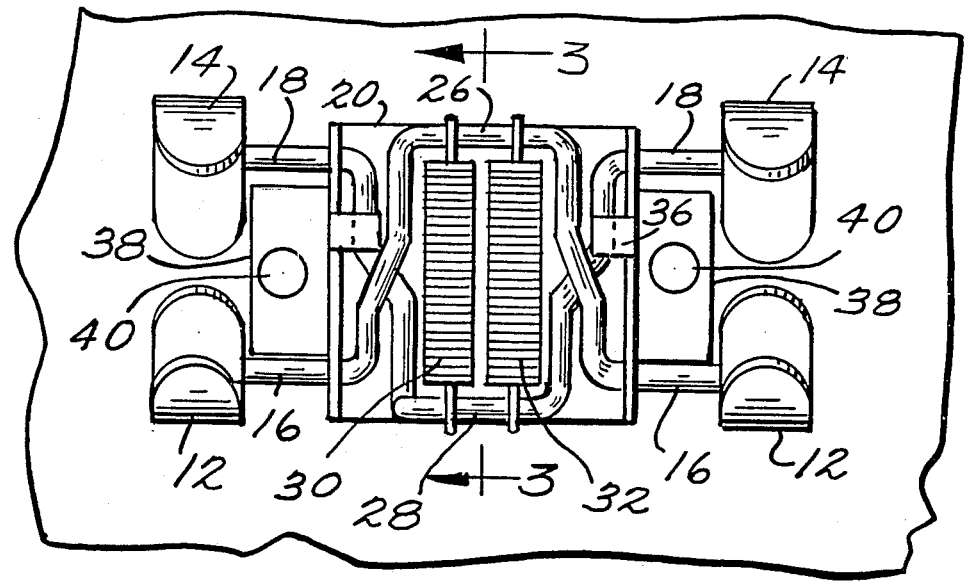
FIG. 1 is a top plan view of the flashlight holder.
Figure 2:
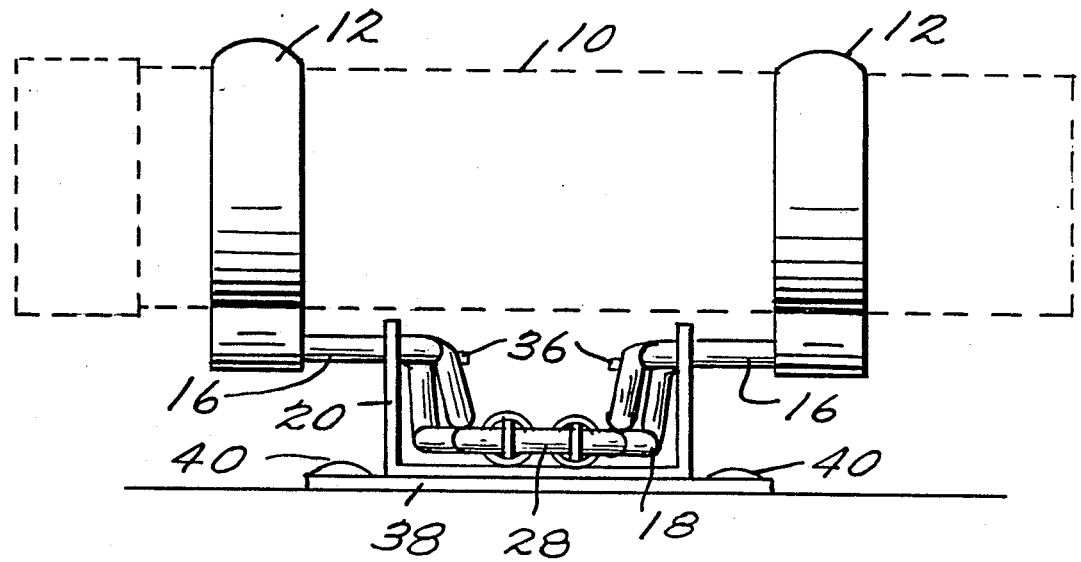
FIG. 2 is a side view of the flashlight holder.

FIGS. 1 and 2 will be used to describe the components of the preferred embodiment.

FIG. 2 illustrates the flashlight holder holding a flashlight 10. Flashlight 10 is held in place by clasps 12 on one side of the device. A clasp 12 is attached to each end of top connecting rod 16. Connecting rod 16 is referred to as a top connecting rod because it is positioned over connecting rod 18. This can be seen in both FIGS. 1 and 2. The importance of this feature will be described hereinafter.

Attached at the ends of bottom connecting rod 18 are clasps 14. These clasps, along with clasps 12, hold the flashlight in position.

Both top connecting rod 16 and bottom connecting rod 18 are held in place by support plate 20. Support plate 20 includes a pair of holes 22 which allow the rotation of top connecting rod 16 and holes 24 which allow the rotation of bottom connecting rod 18.

The portion of the top connecting rod 16 and bottom connecting rod 18 inside of support plate 20 is, as can be seen FIG. 1, primarily U-shaped. This U-shape of each of the connecting rods results in a middle portion 26 of top connecting rod 16 and a middle portion 28 of bottom connecting rod 18 which are parallel. These middle portions hold springs 30 and 32. The springs 30 and 32 maintain tension between connecting rods 16 and 18. This prevents the flashlight holder moving from a closed state to an open state or vice-versa unless a strong force is applied to overcome the spring tension.

Tabs 34 and 36 prohibit rotation of top connecting rod 16 beyond a certain point. The purpose of these tabs will be described in greater detail hereinafter.

Support plate 20 is mounted to base plate 38. Base plate 38 has holes 40 which are used to insert screws to mount the flashlight holder on an object. However, other types of attachment means other than screws could be used to hold the flashlight holder in place.

Figure 3:
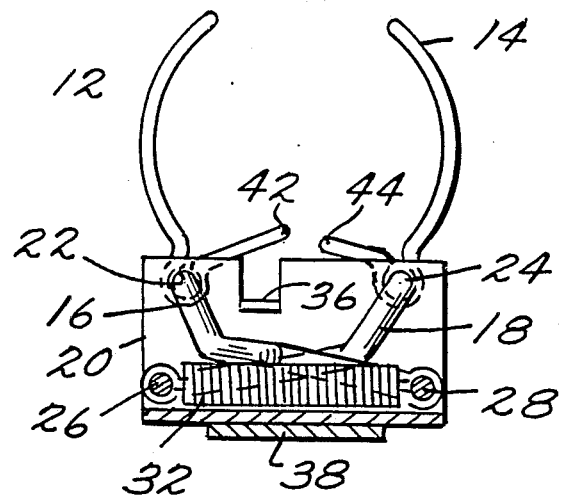
FIG. 3 is a side end view of the flashlight holder in the closed position.
Figure 4:
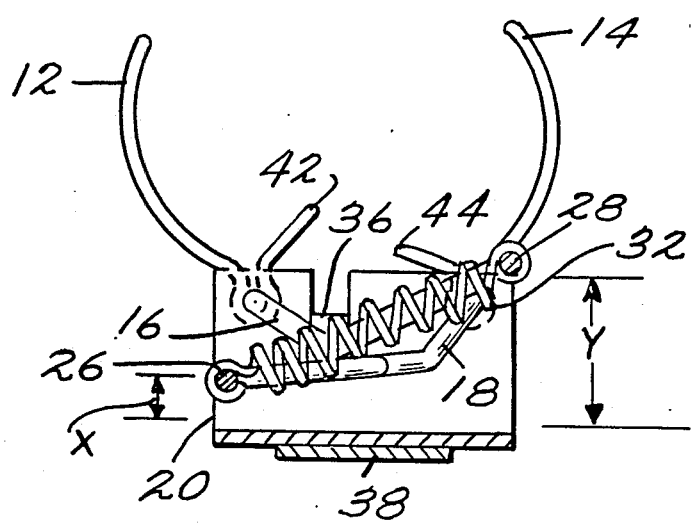
FIG. 4 is a side end view of the flashlight holder in an open position.

Operation of the flashlight holder will now be described with reference to FIGS. 3 and 4. FIG. 3 illustrates the flashlight holder in the closed position. FIG. 4 illustrates the flashlight holder in the open position.

When the flashlight holder is in the closed position as shown in FIG. 3, springs 30 and 32 are in their relaxed position. Movement of clasps 12 and 14 induce tension in the springs 24 and 26. This prohibits movement of the clasps until a force great enough to overcome the tension of the springs is applied.

When the flashlight holder is being opened, clasps 12 rotate along with top connecting member 16 in one direction in holes 22. Similarly, clasps 14 rotate along with bottom connecting member 18 in an opposite direction in holes 24. These rotations cause springs 30 and 32 to stretch. However, at a certain point in the rotation, the spring is stretched at its maximum and then begins to relax. This results in the connecting rods attempting to continue their rotation so that the spring is once again in a relaxed position. However, tabs 34 and 36 prevent the top connecting member from further rotation. Because rotation of top connecting member 16 is prevented, further rotation of bottom connecting member 18 is also prevented.

When rotation begins, the displacement of top connecting member 16 over bottom connecting member 18 results in top connecting member 16 having a greater rotation then bottom connecting member 18. This can be seen in FIG. 4 which shows that bottom connecting member 18 only moving a distance x at its middle portion 28 and top connecting member 16 moving a greater distance y at its middle portion 26. The greater rotation of top connecting member 16 results in top connecting member 16 performing most of the work when the flashlight holder is moved from a closed position to an open position. However, this work is accomplished gradually because of the greater rotation of top connecting member 16. Therefore, it is easier to rotate top connecting member 16. Easier rotation is further facilitated because top connecting member 16 lies above bottom connecting member 18. This results in a device which can be easily opened and closed.

When the flashlight holder is moved from an open position to a closed position, the orientation of lower clasp portion 42 of clasp 12 with respect to lower clasp portion of 44 of clasps 14 ensures that the top connecting member 16 begins the downward movement. Therefore, the force required to initiate the closing of the flashlight holder is minimized. This is accomplished because the lower clasp portion 42 is positioned so that its tip lies above the tip of lower clasp portion 44. Therefore, when a flashlight is placed to be held by the flashlight holder, it will strike the tip of lower clasp portion 42 first. This further results in a device which is easy to use.

I claim:

1. A device for holding an article comprising;
   a base;
   two support plates, each of said support plates including;
   two holes, and
   a first and second rotatable connecting rods, each having two ends, formed so that said ends of each of said connecting rods are parallel and displaced along the same line and each rod having a u-shaped middle portion with legs and a bite portion, said bite portion being parallel to ends but are not along the same lnie as their respective ends, said ends of said first and second connecting rods being placed in said holes of said support plates with said middle portion of said first connecting rod overlaps said middle portion of said second connecting rod so that said first connecting rod rotates a greater amount than said second connecting rod;
   a spring having an end connected to each of said middle portions of said connecting rods that allows said first connecting rod to rotate more easily than said second connecting rod;
   a curved clasp attached to each end of said first and second connecting rods, said clasps attached so that when rotated from an open position to a closed position said article can be held and when rotated from said closed position to said open position said article can be removed.

2. The device according to claim 1 wherein said clasps attached to said first connecting rod have a lower curved portion with a tip displaced above a tip of a lower curved portion of said clasps attached to said second connecting rod with respect to said base so that said first connecting rod initiates rotation from said open position to said closed position.

3. A device according to claim 1 wherein said holding device also includes a tab for preventing movement of said first connecting rod.

* * * * *